United States Patent [19]

Fukahori

[11] Patent Number: 5,223,888
[45] Date of Patent: Jun. 29, 1993

[54] CAMERA
[75] Inventor: Hidehiko Fukahori, Kanagawa, Japan
[73] Assignee: Canon Kabushiki Kaisha, Tokyo, Japan
[21] Appl. No.: 649,723
[22] Filed: Feb. 1, 1991
[30] Foreign Application Priority Data
  Feb. 5, 1990 [JP] Japan .................. 2-25488
[51] Int. Cl.[5] ............................ G03B 17/18
[52] U.S. Cl. ................ 354/475; 354/289.12
[58] Field of Search .......... 354/474, 475, 486, 289.11, 354/289.12

[56] References Cited
U.S. PATENT DOCUMENTS

| | | | |
|---|---|---|---|
| 4,853,726 | 8/1989 | Kawamura et al. | 354/475 |
| 4,862,205 | 8/1989 | Kawamura | 354/475 |
| 4,974,013 | 11/1990 | Ohsawa | 354/475 |
| 5,005,047 | 4/1991 | Fujino et al. | 354/289.12 |
| 5,081,483 | 1/1992 | Ishimura et al. | 354/289.12 |

Primary Examiner—Russell E. Adams
Attorney, Agent, or Firm—Fitzpatrick, Cella, Harper & Scinto

[57] ABSTRACT

A camera comprising an operation member to which a plurality of exposure mode marks are attached, the operation member being arranged to be movable and to enable the camera operator to know an exposure mode selecting state with the position of the mark of a selected exposure mode adjusted to the position of an index mark; and an electro-optical display device which includes at least a numerical value display part, the display device being arranged to display camera information other than information indicated by the plurality of exposure mode marks attached to the operation member.

10 Claims, 5 Drawing Sheets

CAMERA

BACKGROUND OF THE INVENTION

1. Field of the Invention

This invention relates to a camera having a display device.

2. Description of the Related Art

The recent advancement of electronic technology has greatly increased the functions of cameras. In respect to the exposure modes of cameras, for example, program exposure modes of varied kinds have become possible in addition to the conventional manual exposure, shutter priority automatic exposure (hereinafter abbreviated to AE) and aperture priority AE. The exposure programs include, for example, programs for portraits, for close-up shots, for a fast moving object, for a landscape, etc. Further, a new AE mode called a depth priority AE which takes information on automatic focusing into consideration also has become available. Heretofore, the camera of this kind has been provided with a display device which is arranged as shown in FIGS. 5, 6 and 7.

In FIG. 5, the illustration includes a camera body 40; an exposure mode button 41; an exposure compensation button 42; a main switch 43; a photo-taking position indicating mark 43a; a lock position indicating mark 43b; a main switch index mark 44; a liquid crystal display panel 45; a shutter release button 4; a setting dial 3; and an AE lock button 5. In setting an exposure mode, the position of the main switch 43 is set by adjusting the L photo-taking position indicating mark 43a to the index mark 44. After that, the camera is set in a desired exposure mode by turning the setting dial 3 while pushing above stated exposure mode button 41. FIG. 6 shows the whole information that can be displayed on the liquid crystal display panel 45 of FIG. 5. In FIG. 6, the illustration includes exposure mode marks 46 to 50 including a manual exposure mark 46, a program exposure mark 47, a shutter priority AE mark 48, an aperture priority AE mark 49 and a depth priority AE mark 50. When the setting dial 3 is turned while pushing the exposure mode button 41 of FIG. 5 as mentioned above, the marks for the exposure modes which are serially set light up in the order of the manual exposure mark 46, the program exposure mark 47, the shutter priority AE mark 48, ----. Other displays shown in FIG. 6 include an ISO film sensitivity setting display 51. In a case where the film is contained in a cartridge which is provided with a DX code, the ISO film sensitivity value is automatically read after automatic film loading. Then, the ISO sensitivity setting display 51 lights up for a given period of time. A shutter speed display 52 is a seven-segment display which is arranged to be used also for the ISO information display. An aperture value display 53 is a seven-segment display which is arranged to be used also for displaying an exposure compensating value. An exposure compensation mark 54 is arranged to light up when the above-stated setting dial 3 is turned while pushing the exposure compensation button 42 of FIG. 5. A "+" or "−" mark 55 is provided for an exposure compensation value. The exposure compensation value display 53 is a seven-segment display which displays an exposure compensation value together with the "+" or "−" mark.

Reference numerals 56 and 57 denote automatic focusing (hereinafter abbreviated to AF) mode displays The AF mode display 56 indicates a one-shot mode in which the focus position of the lens of the camera is locked when an in-focus state is attained. The AF mode display 57 indicates a servo mode in which the position of the lens is shifted following the movement of an object to be photographed. A numeral 58 denotes a manual focusing mode display. A cartridge mark 59 is arranged to light up when the camera is loaded with a film. Film feeding marks 60 are arranged to light up one after another accordingly as the film is fed. A display 61 is arranged to show a total number of film frames. Displays 62 and 63 are provided for indicating film feeding modes, the display 62 being arranged to indicate a single-frame shooting mode and the display 63 a continuous shooting mode. A display 64 is arranged to indicate a self-timer mode.

The display arrangement becomes as shown in FIG. 7 when, for example, the exposure mode selected is the manual exposure mode; the shutter speed is at 1/4000 sec; the aperture value is set at F 5.6; the AF mode is one-shot AF mode; exposure compensation is applied; and the film has been used up to the 36th frame in the single-frame shooting mode. Despite the many exposure modes, the camera which is arranged in the above-stated manner permits selection of any desired exposure mode by operating the mode button 41 together with the setting dial 3. Therefore, the exposure mode can be easily set.

However, the conventional camera described above does not let the camera operator know all the exposure modes available without pushing the mode setting button 41 while turning the setting dial 3. Further, after one mode is found with these operation members operated, a next mode available remains unknown until these members are operated again. While these functions present no problem for users who are familiar with the camera, a camera of the kind having so many different functions requires much time in mastering them. Therefore, a camera of this kind is difficult for beginners.

Another shortcoming of the conventional camera resides in that, the inclusion of the exposure mode marks in the displays to be made on the liquid crystal display panel 45 inevitably makes the size of each display too small for easy sighting.

SUMMARY OF THE INVENTION

It is one aspect of this invention to provide a camera which is arranged to have information on all the selectable exposure modes indicated in marks by means of a dial and to have information on other matters displayed by an optical display device, so that the camera operator is always enabled to readily know all the exposure modes by just looking at the dial.

The above and other objects and features of the invention will become apparent from the following detailed description of an embodiment thereof taken in connection with the accompanying drawings.

DETAILED DESCRIPTION OF THE PREFERRED EMBODIMENT

Figure 1:
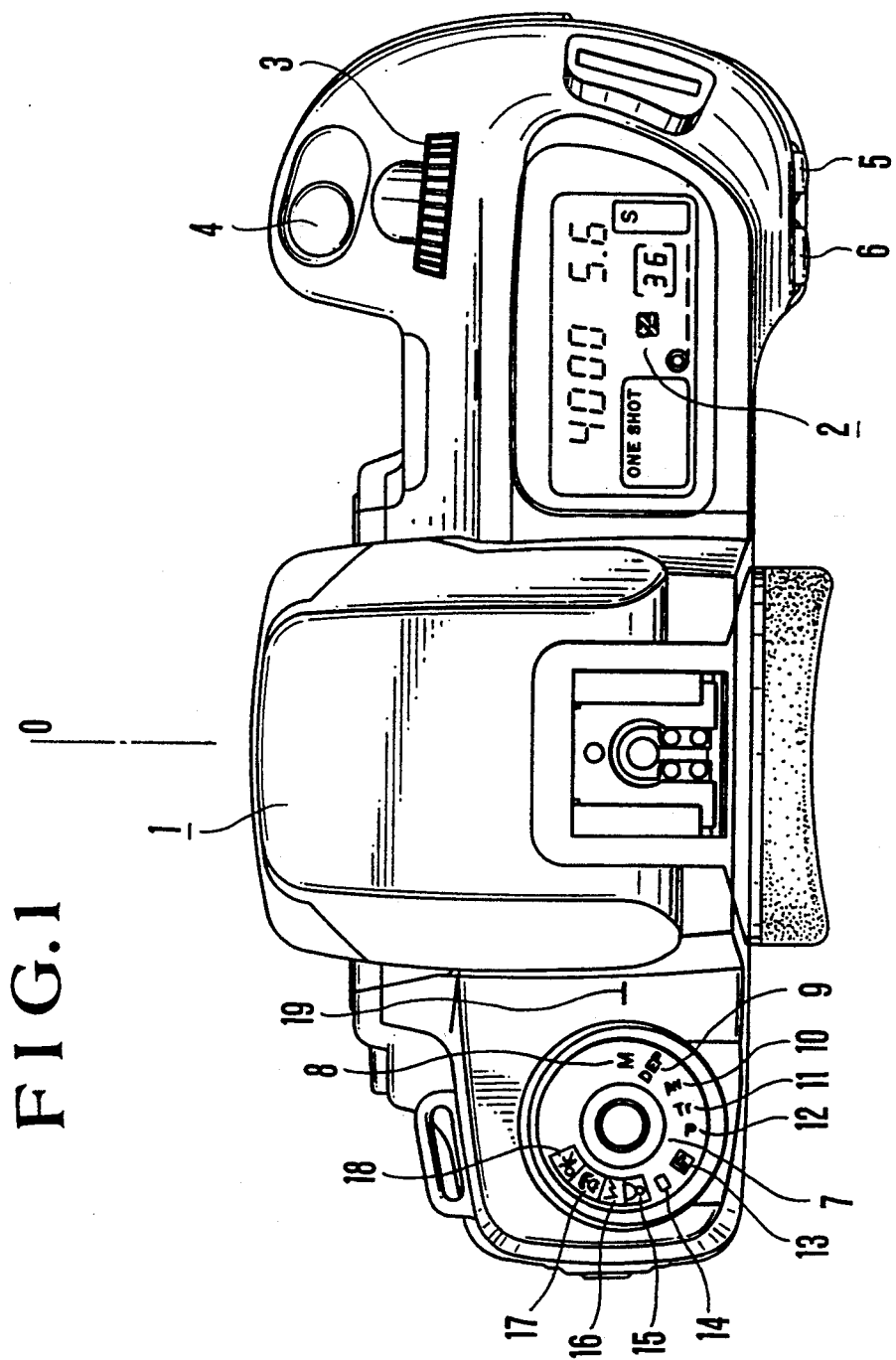
FIG. 1 is a plan view showing the camera body of an embodiment of this invention.

FIGS. 1 to 4 show a camera arranged according to this invention as an embodiment thereof. FIG. 1 is a top view of the camera. Referring to FIG. 1, a camera body 1 is arranged to have a photo-taking lens mounted thereon in an upper portion as viewed in FIG. 1. A known pentagonal prism which is not shown is disposed approximately in the middle of the camera body. A liquid crystal display panel 2 consists of electro-optical display elements. A setting dial 3 is disposed near the liquid crystal display panel 2. The value of shutter speed and that of the aperture are variable by operating this dial 3. A shutter release button 4 is arranged as follows: A light measuring action and an automatic focusing (AF) action are arranged to be performed when the release button 4 is pushed down to a first stroke position. A shutter release is effected when the release button 4 is pushed down to a second stroke position thereof. An AE lock button 5 is arranged such that, when the camera is in a manual mode which will be described later, the aperture value of the camera can be varied by turning the above-stated dial 3 while this button 5 is continuously pushed. An exposure compensation button 6 is arranged to permit an exposure to be compensated by turning the setting dial 3 while the button 6 is continuously pushed.

An exposure mode dial 7 is rotatably carried by an exterior member of the camera. Reference numerals 8 to 18 denote exposure mode marks and a main switch lock mark which are printed on the dial 7. The exposure mode dial 7 is arranged to indicate a mode selected with the position of one of the marks 8 to 18 adjusted to that of a fixed index mark 19 which is printed on the exterior member of the camera. Further, the marks 8 to 18 provided on the exposure mode dial 7 are arranged such that they can be clicked and set in a position coinciding with the fixed index mark 19.

The mark 8 indicates a manual exposure mode. With this mode selected, a shutter speed can be set by turning the above-stated setting dial 3. An aperture value can be set by turning the setting dial 3 while pushing the above-stated AE lock button 5. The mark 9 indicates a mode called a depth priority AE mode. In that mode, the camera determines an aperture value in such a way as to control the depth of field according to information on automatic focusing. Then, a shutter speed is determined and set at such a value that gives an adequate exposure for the aperture value thus determined. After the aperture value is determined, a program is shiftable on an equal EV chart by turning the setting dial 3.

The mark 10 indicates an aperture priority AE mode. When the setting dial 3 is turned with the camera set in this mode, an aperture value is set. The shutter speed is then set at such a value that gives an adequate exposure for the aperture value thus selected.

The mark 11 indicates a shutter priority AE mode. With that mode selected, a shutter speed can be set at any desired value by turning the setting dial 3. Then, an aperture value is determined in such a way as to give an adequate exposure for the shutter speed set.

The mark 12 indicates a program exposure mode. In the program exposure mode, the camera determines a combination of the aperture value and the shutter speed in accordance with a program. The program is shiftable by operating the above-stated setting dial 3.

The mark 13 indicates a main switch lock mode. The camera is inoperable in this mode. The mark 14 indicates a full automatic mode. In that mode, not only a combination of a shutter speed and an aperture value is automatically determined but also the film feeding mode is automatically set in a single-frame shooting mode and the AF mode in a one-shot mode. The full automatic mode is best suited for beginners in general.

The mark 15 indicates a program which is arranged solely for portraits to blur the backgrounds of pictures in such a way as to make the images of persons conspicuous by selecting a relatively large aperture.

The mark 16 indicates a program which is arranged for landscapes to obtain a deeper depth of field than the program of the mark 12 by limiting the diaphragm to an aperture not larger than the aperture of F 5.6.

The mark 17 indicates a close-up program which is arranged to fixedly set the aperture value at F 5.6. In accordance with this program, when the shutter speed required comes to exceed the maximum available speed of the camera, the aperture is shifted to a smaller aperture than the aperture of F 5.6. The mark 18 indicates a program arranged for sport photographs. In accordance with that program, the shutter speed is set at a high speed value in such a way as to take the picture of a fast moving object as in pause. Meanwhile, the film feeding mode is set in the continuous shooting mode and the AF mode in the servo mode.

Figure 2:
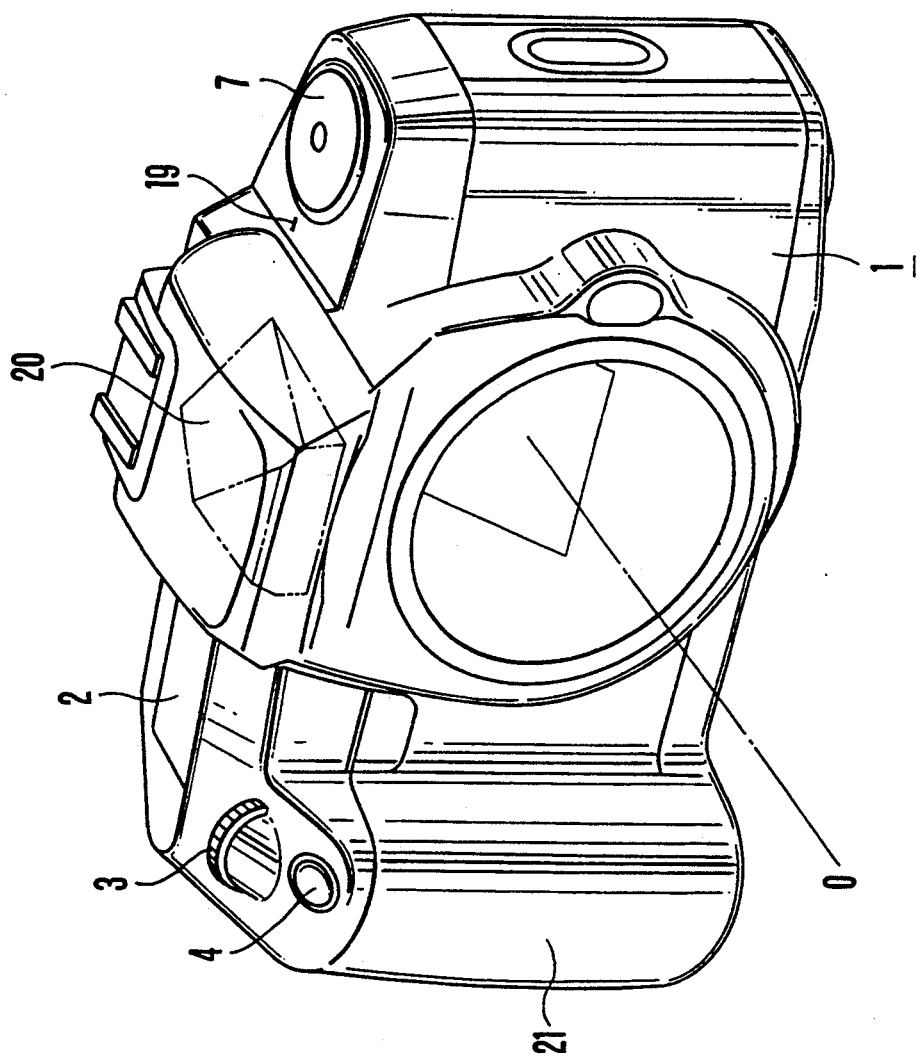
FIG. 2 is an oblique view showing the camera body of FIG. 1.

FIG. 2 is an oblique view showing the camera of this embodiment. In FIG. 2, the same parts as those of FIG. 1 are indicated by the same reference numerals. The illustration includes a camera body 1; a liquid crystal display panel 2; a setting dial 3; a shutter release button 4; an exposure mode setting dial 7; and a fixed index mark 19. A pentagonal prism 20 is disposed approximately in the middle part of the camera. The shutter release button 4 is disposed in the upper part of a grip 21. Since the camera is generally held by the right hand, the grip is provided on the right-hand side of the camera body. As a result, the right side of the camera body is larger than the left side. The above stated liquid display panel 2 is disposed on the upper surface of the right side part of the camera body 1 which is larger.

Further, in each of FIGS. 1 and 2, a line O denotes a photographic optical axis.

Figure 3:
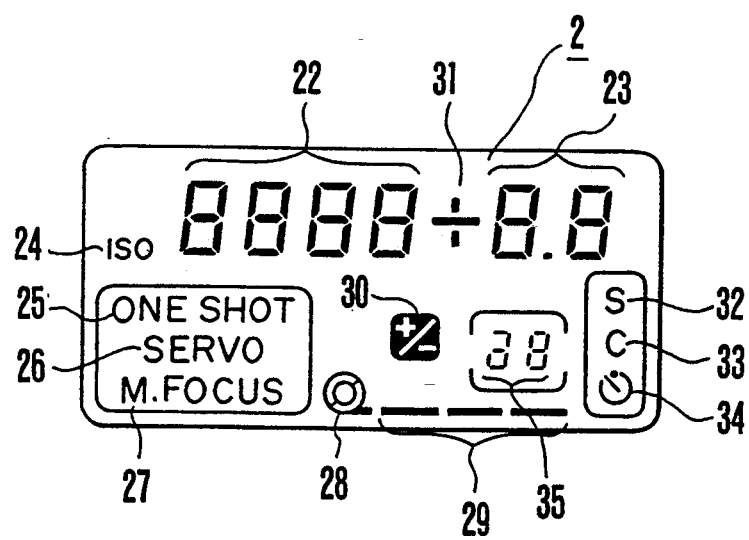
FIG. 3 is a plan view showing the whole display that can be made by a liquid crystal display device of FIG. 1.

FIG. 3 shows all the display contents of the above-stated liquid crystal display panel 2 as in a state of being lighted up. A display 22 is a seven-segment display consisting of four figures for indicating a shutter speed value. The display 22 is arranged to be used also for displaying an ISO film sensitivity value. A display 23 is a seven-segment display which consists of two figures indicating an aperture value. The display 23 is arranged to be used also for a display of an exposure compensation value which will be described later.

A mark 24 is arranged to light up when the ISO sensitivity value is to be displayed. In cases where a film cartridge provided with a DX code is used, this mark 24 remains lighted up for a given period of time after completion of an automatic film loading process. In this instance, the ISO film sensitivity value is displayed by the seven-segment display 22 of four figures. In a case where the film cartridge is not provided with any DX code, the mark 24 is constantly lighted up to give a warning. Reference numerals 25, 26 and 27 denote AF mode displays. The display 25 indicates a one-shot AF mode in which the position of a focusing lens is locked when an in-focus state is attained. The display 26 indicates a servo AF mode in which the focusing lens is allowed to continuously move accordingly as the object moves. The display 27 indicates a manual focusing mode in which the focus is manually adjusted.

Each of the modes indicated by the displays 25, 26 and 27 is selectable one after another by turning the above-stated setting dial 3 while pushing the AF mode button which is not shown. A cartridge mark 28 is arranged to light up when the camera is loaded with a film cartridge. Film feed confirmation mark displays 29 are arranged in array to light up one after another from the left side of the array during the process of film feeding. These three mark displays which are bar marks are arranged to be used also for indicating the capacity of a battery when a battery check operation member which is not shown is operated. An exposure compensation mark 30 is arranged to light up when an exposure compensating action is performed by turning the above-stated setting dial 3 while pushing the exposure compensation button 6. A plus/minus mark display 31 is arranged to display a plus mark or a minus mark when the exposure compensation is made while the value of the compensation is displayed by the above-stated display 23. After completion of the exposure compensation setting, the exposure compensation mark 30 alone remains lighted up to give a warning that the exposure compensation applies. Displays 32 and 33 are provided for film feeding modes. The display 32 indicates a single-frame shooting mode in which the film feeding process comes to a stop when a shot is made by pushing the release button 4 even if the button 4 is continuously pushed thereafter. However, a next shot can be made by pushing the release button 4 once again after the finger of the camera operator is detached from the button 4. The display 33 indicates a continuous shooting mode in which shots are consecutively made as long as the release button 4 continuously remains in a pushed state. A display 34 indicates a self-timer mode. When a self-timer setting member which is not shown is operated, the camera is set in the self-timer mode and the display 34 lights up. When the release button 4 is pushed under this condition, a shutter release is effected after the lapse of a given period of time. A film frame counter 35 is arranged to indicate the next usable frame number of the film. Every time the film is wound after completion of one shot, the value of the counter 35 is incremented by one.

Figure 4:
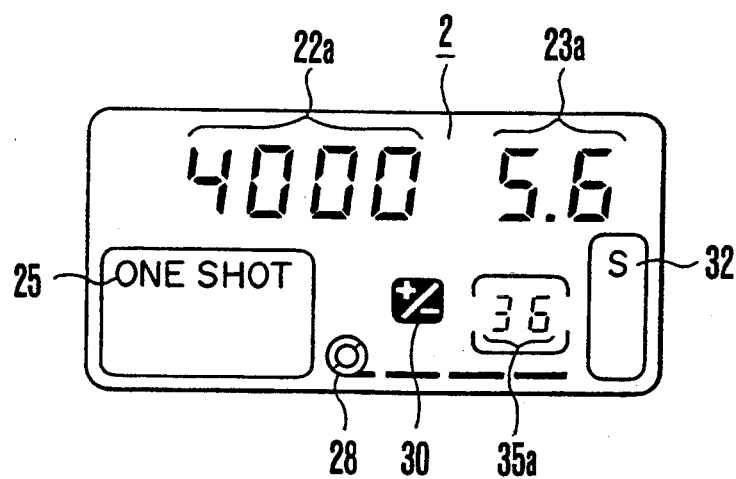
FIG. 4 shows by way of example an actual display to be made by the liquid crystal display device of FIG. 1.
Figure 5:
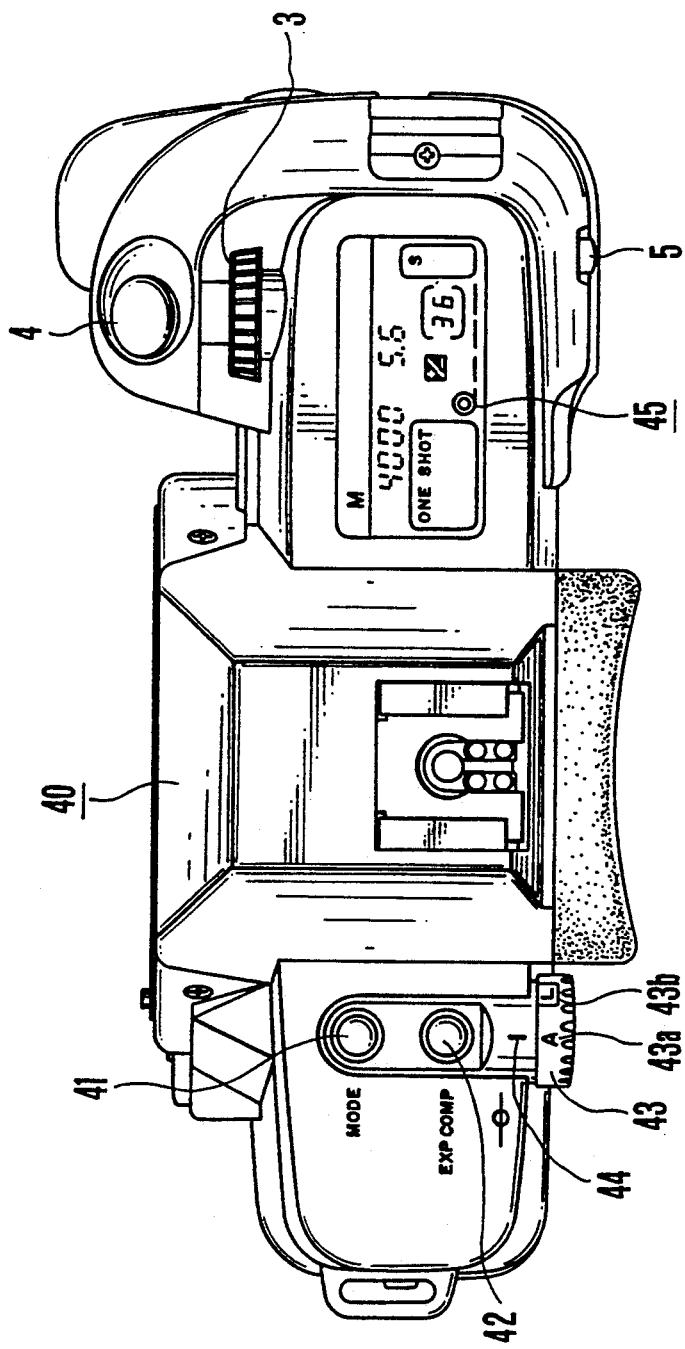
FIG. 5 is a plan view showing the camera body of the conventional camera.
Figure 6:
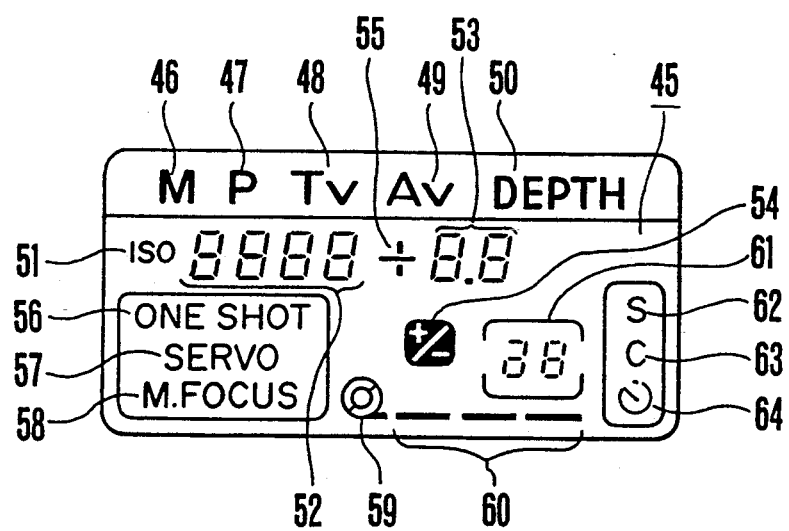
FIG. 6 shows the whole liquid crystal display that can be made by the conventional camera.
Figure 7:
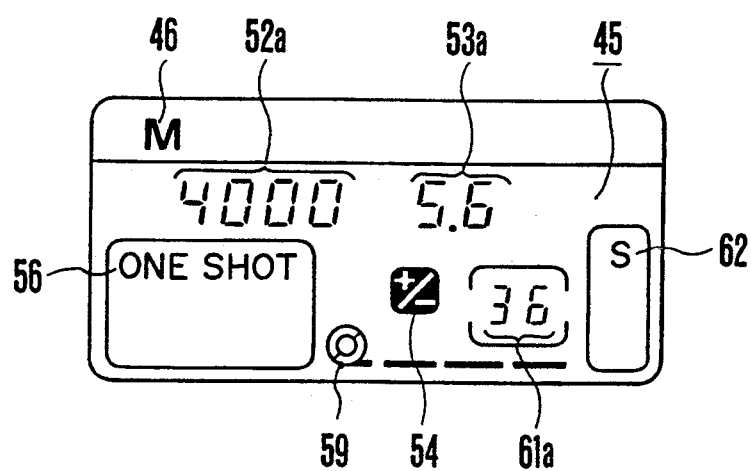
FIG. 7 shows an example of a display made by the conventional liquid crystal display.

With the camera arranged in this manner, all the available exposure modes are shown on the exposure mode dial 7. For example, the manual exposure mode mark 8 is adjusted to the fixed index mark 19 as shown in FIG. 1. Then, the shutter speed is set, for example, at 1/4000 by turning the setting dial 3; the aperture value is set at F 5.6 by turning the setting dial 3 while pushing the above-stated button 5; the AF mode is set in the one-shot AF mode; the film feeding mode is set in the single-frame shooting mode; and the exposure compensation is applied. When photographing shots are made up to the 36th frame portion of the film under this condition, for example, the liquid crystal display panel 2 makes a display as shown in FIG. 4. FIG. 6 which shows a display made by the conventional camera which is about equal to the embodiment of this invention in terms of specifications. Comparison of the display of the embodiment with that of the conventional camera shows a salient difference between them. Since the sizes of their liquid crystal display panels 2 are equal to each other, the shutter speed and the aperture value can be displayed in larger size in accordance with the invention than the conventional camera. More specifically, in the case of the embodiment, the exposure mode display is provided on the dial 7 disposed on the left upper surface of the camera body. The arrangement obviates the necessity of having the exposure mode display on the liquid crystal display panel 2. This enables the shutter speed and aperture values to be displayed in a large size.

The AF mode and the film feeding mode do not have to be displayed in large sizes. They can be displayed in a small size as long as they are discernible. Whereas, the shutter speed and the aperture value are varying time after time according to the condition of the object. Their values must be constantly checked to ensure that they coincide with what is desired by the photographer. It may be safely said that control over a camera means control over the shutter speed and the aperture value.

Further, as shown in FIG. 1, the exposure mode dial 7 is disposed on the left side of the camera body. As mentioned in the foregoing, the right side of the camera body is larger than the left side. Therefore, the dial which is in a circular shape can be conveniently disposed on the left side. Since the right side is arranged to be larger, the liquid crystal display panel can be conveniently disposed on the right side. Further, since the setting dial 3 which is to be operated by the right hand index finger for easy manipulation is disposed near to the liquid crystal display panel 2, the shutter speed and aperture values which are displayed in a larger size can be easily set and confirmed.

As described in the foregoing, the embodiment is arranged to have all the available exposure modes indicated on the exposure mode setting dial. This arrangement permits the shutter speed and the aperture value to be displayed in a larger size on an electro-optical display device such as the liquid crystal display panel. These values, therefore, can be easily sighted.

Further, the arrangement of having all the available exposure modes indicated on the dial obviates the necessity of looking for an exposure mode by having the exposure modes displayed one after another like in the case of the conventional arrangement. The invented arrangement thus allows the camera operator to find the exposure functions at once while the camera is equipped with an electro-optical display device such as the liquid crystal display device which is capable of giving a substantial amount of information. Further, change-over from one exposure mode to another can be easily accomplished as the degree of operation required for that purpose is known. This greatly enhances the operability of the camera.

The arrangement of having the display device disposed on the upper surface on the side of the camera grip and the exposure mode dial on the upper surface on the opposite side of the camera body is highly advantageous in respect of effective space utilization. Further, a correcting operation member such as the setting dial which is disposed near to the display device improves confirming-and-correcting operability in conjunction with the display in a larger size.

While the embodiment is arranged to make the size of display larger for the shutter speed and the aperture value, data other than these values may be arranged to be displayed in a larger size. Further, it is also possible to increase the kinds of data to be displayed by arranging them to be displayed in the same size as the conventional display arrangement.

Further, the embodiment described is arranged to have the marks 8 to 18 of all the exposure modes indicated on the dial 7. However, the arrangement may be changed to have some of the exposure mode marks displayed on the display device 2. Such modification still permits more advantageous utilization of the display area available on the display device 2 than the conventional display device. In other words, some of the exposure mode marks are arranged to be indicated on the dial 7 and the marks indicated on the dial 7 are arranged to be excluded from the exposure mode marks displayed on the display device 2. Such arrangement also makes the display on the display device 2 more easily sightable and permits important numerical values to be displayed in a larger size within the display area of the display device.

In the case of the embodiment described, the exposure modes include a plurality of (six) program modes. In addition to the program modes, there are the AV (aperture) priority mode, the TV (shutter) priority mode and the manual mode. If the mode marks of all of these modes are to be displayed on the display device, the display device must be arranged to have a larger size than the size currently adopted and to have a smaller display size for important numerical values.

What is claimed is:

1. A camera comprising:
   (a) an operation member provided with at least a plurality of program mode marks and a specific mark indicating non-operation of the camera, said operation member being arranged to be movable and to enable a particular program mode, corresponding to one of said plurality of program mode marks, by adjusting the position of one of said plurality of program mode marks to an index mark and to select non-operation of the camera by adjusting the specific mark to the position of the index mark; and
   (b) an electro-optical display device including at least a numerical value display part, said display device being arranged to display camera information other than information indicated by said plurality of program mode marks provided on said operation member.

2. A camera according to claim 1, wherein said operation member is formed in the shape of a turnable dial.

3. A camera according to claim 2, wherein said operation member and said display device are separately arranged in positions on an upper surface of said camera on two opposite sides of a pentagonal prism.

4. A camera according to claim 3, wherein said display device is disposed on one side of said camera where a camera grip is provided.

5. A camera according to claim 1, wherein said display device includes a first numerical display part arranged to display a shutter time value and an aperture value and a second numerical display part arranged to display a number of a photographing frame.

6. A camera according to claim 1, further comprising a second operation member disposed in the vicinity of said display device and arranged to change camera information.

7. A camera comprising:
   (a) an electro-optical display device arranged on an upper surface of said camera on the side of a grip across a pentagonal prism, said display device being arranged to display camera information including a shutter time value and an aperture value;
   (b) a correcting operation member disposed in the vicinity of said display device; and
   (c) a rotary dial disposed on the upper surface of said camera on one side opposite to the side on which said display device is disposed, said rotary dial being provided with a plurality of marks indicating at least all program modes of said camera and a specific mark indicating non-operation of said camera, wherein said rotary dial is rotatable and arranged to enable a particular program mode, corresponding to one of said plurality of marks, by adjusting the position of a selected program mode mark to an index mark and to select non-operation of the camera by adjusting the specific mark to the position of the index mark.

8. A camera according to claim 7, wherein said display device includes a first numerical display part arranged to display a shutter time value and an aperture value and a second numerical display part arranged to display a number of a photographing frame.

9. A camera according to claim 7, wherein said correcting operation member is disposed between said display device and a shutter release button.

10. A camera according to claim 9, wherein said correcting operation member is formed in the shape of a rotary dial.

* * * * *